US010289948B2

(12) United States Patent
Kawaguchi

(10) Patent No.: US 10,289,948 B2
(45) Date of Patent: May 14, 2019

(54) MAINTENANCE SYSTEM, AND COMPUTER READABLE RECORDING MEDIUM STORING A MAINTENANCE PROGRAM

(71) Applicant: KYOCERA Document Solutions Inc., Osaka (JP)

(72) Inventor: Tomoya Kawaguchi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 4 days.

(21) Appl. No.: 15/636,600

(22) Filed: Jun. 28, 2017

(65) Prior Publication Data
US 2018/0005104 A1    Jan. 4, 2018

(30) Foreign Application Priority Data
Jul. 1, 2016    (JP) .................................. 2016-132099

(51) Int. Cl.
*G06K 19/10* (2006.01)
*G06F 13/20* (2006.01)
*G06F 13/40* (2006.01)
*H04L 29/06* (2006.01)
*H04W 12/06* (2009.01)
*H04W 12/08* (2009.01)

(52) U.S. Cl.
CPC ............. *G06K 19/10* (2013.01); *G06F 13/20* (2013.01); *G06F 13/4068* (2013.01); *H04L 63/0853* (2013.01); *H04L 63/105* (2013.01); *H04W 12/06* (2013.01); *H04W 12/08* (2013.01)

(58) Field of Classification Search
USPC .......................................................... 235/380
See application file for complete search history.

(56) References Cited

U.S. PATENT DOCUMENTS

2001/0048823 A1* 12/2001 Nomura ............. G03G 15/5016
                                                                    399/80
2005/0265744 A1* 12/2005 Uruta .................... G03G 15/50
                                                                    399/80

FOREIGN PATENT DOCUMENTS

JP        2012-155647        8/2012

* cited by examiner

*Primary Examiner* — Rafferty D Kelly

(57) ABSTRACT

A maintenance system includes an IC card unique to a service person, a general purpose mobile terminal device, an image forming apparatus as a maintenance target, and an authentication server. In the general purpose mobile terminal device, the maintenance authentication processing unit (a) obtains IC card identification information from the IC card using an IC card reader, (b) transmits the obtained IC card identification information to the authentication server, (c) receives user rank information corresponding to the IC card identification information from the authentication server, and (d) transmits the received user rank information to the image forming apparatus using a peripheral device interface. The image forming apparatus receives the user rank information from the general purpose mobile terminal device, determines a usage permission range corresponding to the received user rank information, and permits usage of a maintenance function restricted to the usage permission range.

4 Claims, 6 Drawing Sheets

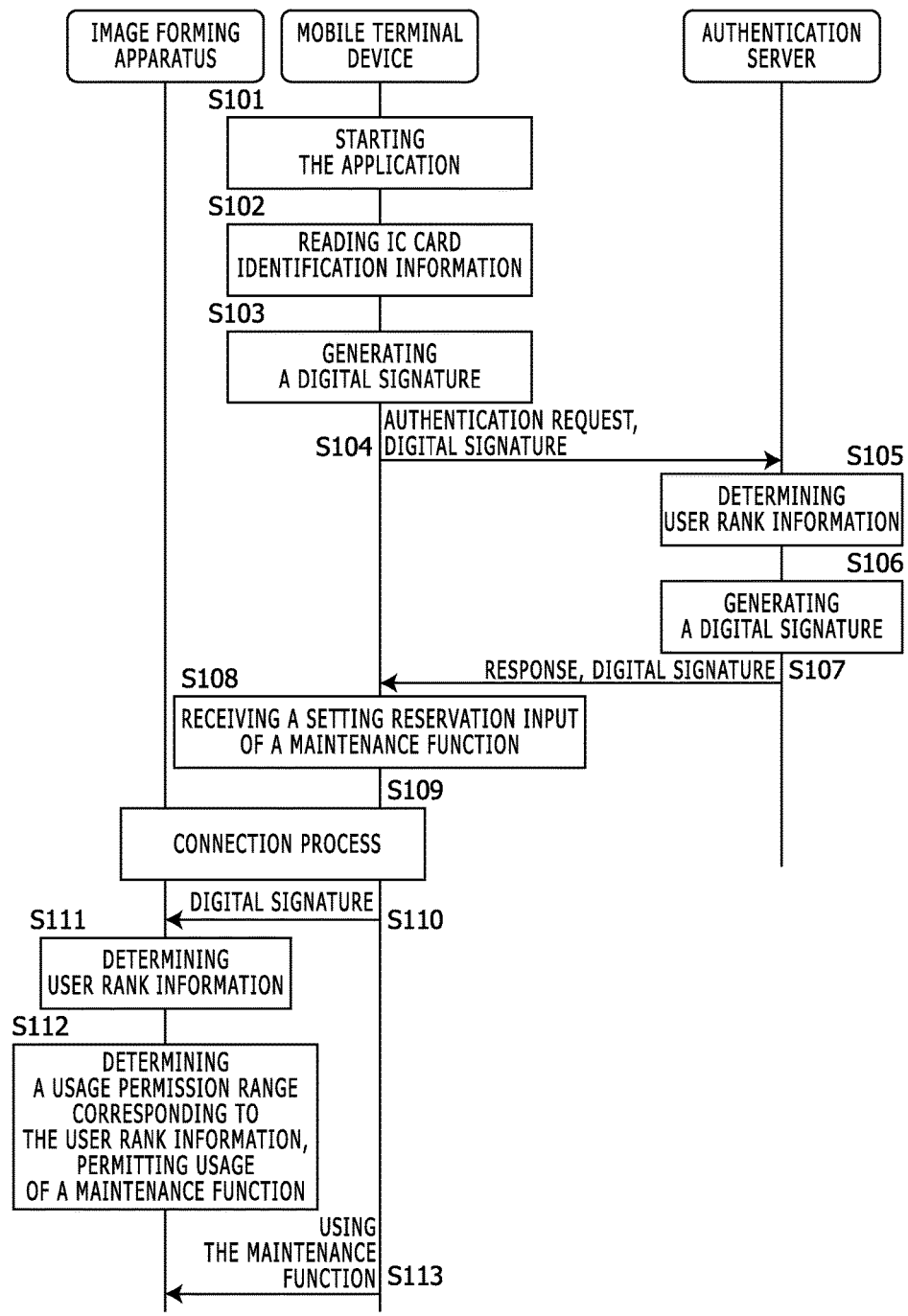

MAINTENANCE SYSTEM, AND COMPUTER READABLE RECORDING MEDIUM STORING A MAINTENANCE PROGRAM

CROSS-REFERENCE TO RELATED APPLICATIONS

This application relates to and claims priority rights from Japanese Patent Application No. 2016-132099, filed on Jul. 1, 2016, the entire disclosures of which are hereby incorporated by reference herein.

BACKGROUND

1. Field of the Present Disclosure

The present disclosure relates to a maintenance system, and a computer readable recording medium storing a maintenance program.

2. Description of the Related Art

In a maintenance system, a mobile telephone device obtains an inquiry code from an image forming apparatus for causing the image forming apparatus to change to a maintenance mode, transmits the inquiry code and a unique identification information of the mobile telephone device to an authentication management server, receives from the authentication management server an authentication code that is issued to a valid unique identification information and a valid inquiry code, and causes the image forming apparatus to change to the maintenance mode by using the authentication code.

However, in the aforementioned system, it is required to register mobile telephone devices in a server and distribute the mobile telephone devices to plural service persons respectively, and each of the service persons can not perform the maintenance of the image forming apparatus without using the registered mobile telephone device.

For example, when the mobile telephone device can not be used in a customer site due to malfunction, battery exhaustion or the like, there are no alternate devices and consequently the service person hardly performs the maintenance of the image forming apparatus immediately.

SUMMARY

A maintenance system according to an aspect of the present disclosure includes an IC (Integrated Circuit) card unique to a service person; a general purpose mobile terminal device; an image forming apparatus as a maintenance target; and an authentication server. The general purpose mobile terminal device includes a wireless communication unit capable of communicating with the authentication server; a peripheral device interface capable of communicating with the image forming apparatus; an IC card reader configured to obtain IC card identification information of the IC card; and a maintenance authentication processing unit. The maintenance authentication processing unit (a) obtains the IC card identification information using the IC card reader, (b) transmits the obtained IC card identification information to the authentication server using the wireless communication unit, (c) receives user rank information corresponding to the IC card identification information from the authentication server, and (d) transmits the received user rank information to the image forming apparatus using the peripheral device interface. The authentication server manages the IC card identification information corresponding to IC cards of the service persons and the user rank information of the service persons so as to associate the IC card identification information and the user rank information with each other in a database, and when receiving the IC card identification information from the general purpose mobile terminal device, determines the user rank information corresponding to the received IC card identification information using the database and transmits the determined user rank information to the general purpose mobile terminal device. The image forming apparatus receives the user rank information from the general purpose mobile terminal device, determines a usage permission range corresponding to the received user rank information, and permits usage of a maintenance function restricted to the usage permission range.

A computer readable recording medium according to an aspect of the present disclosure stores a maintenance program. The maintenance program causes a computer in a general purpose mobile terminal device to act as a maintenance authentication processing unit. The maintenance authentication processing unit (a) obtains IC card identification information from an IC card unique to a service person using an IC card reader of the general purpose mobile terminal device, (b) transmits the obtained IC card identification information to an authentication server using a wireless communication device of the general purpose mobile terminal device, (c) receives user rank information corresponding to the IC card identification information from the authentication server, and (d) transmits the received user rank information to an image forming apparatus as a maintenance target using a peripheral device interface of the general purpose mobile terminal device and thereby causes the image forming apparatus to permit usage of a maintenance function restricted to a usage permission range specified by the user rank information.

These and other objects, features and advantages of the present disclosure will become more apparent upon reading of the following detailed description along with the accompanied drawings.

BRIEF DESCRIPTION OF THE DRAWINGS

FIG. 6 shows a sequence diagram that explains authentication before using a maintenance function in the maintenance system of Embodiment 3.

DETAILED DESCRIPTION

Hereinafter, embodiments according to an aspect of the present disclosure will be explained with reference to drawings.

Embodiment 1

Figure 1:
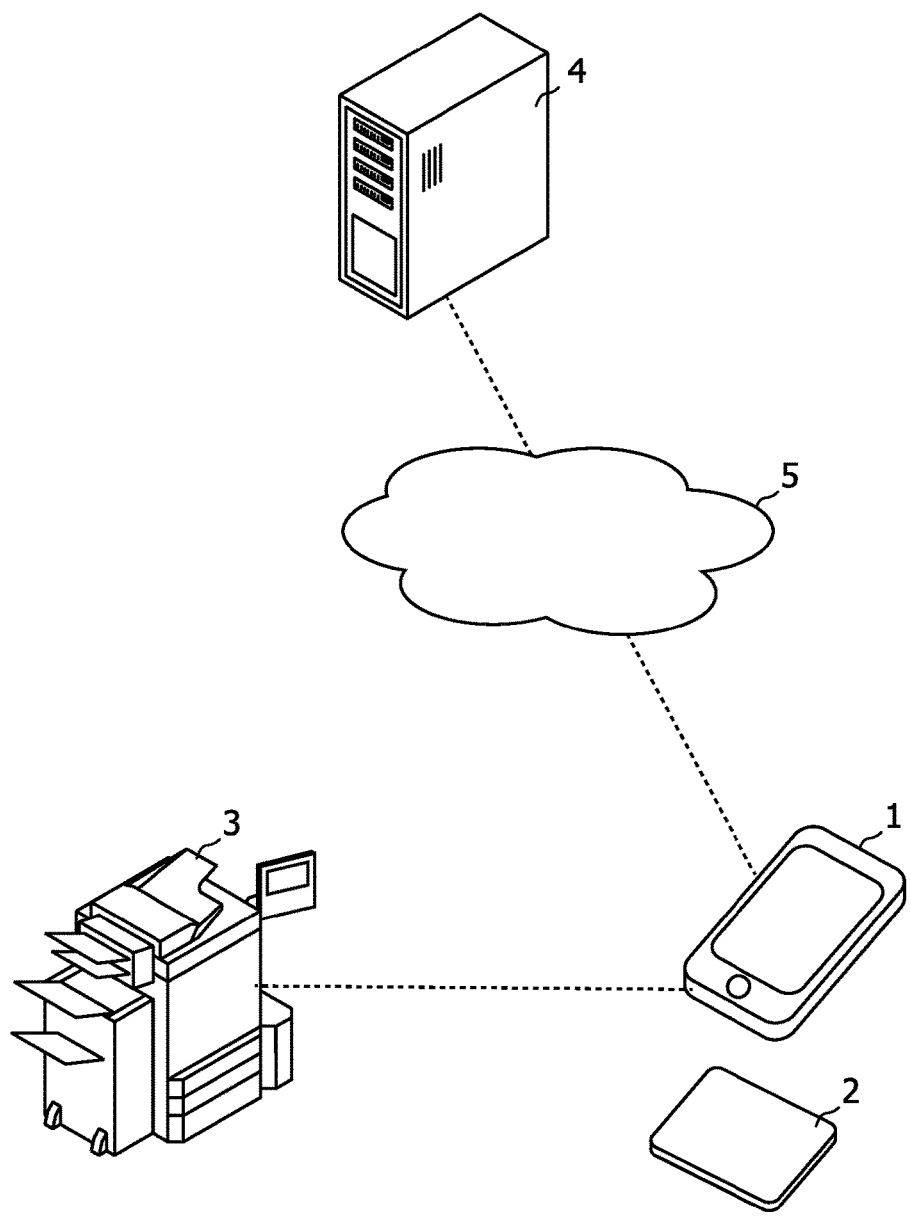
FIG. 1 shows a configuration of an maintenance system according to an embodiment of the present disclosure.

FIG. 1 shows a configuration of a maintenance system according to an embodiment of the present disclosure. The maintenance system shown in FIG. 1 includes a mobile terminal device 1, an IC card 2 unique to a service person, an image forming apparatus 3 as a maintenance target, and an authentication server 4.

The mobile terminal device 1 includes a wireless communication unit capable of connecting to a wide area network 5 such as Internet, and a processor capable of executing a maintenance program.

The IC card 2 is a card that includes a built-in IC chip such as FeliCa (registered trademark), and the IC cards 2 assigned to respective service persons are distributed to the service persons, respectively.

Figure 2:
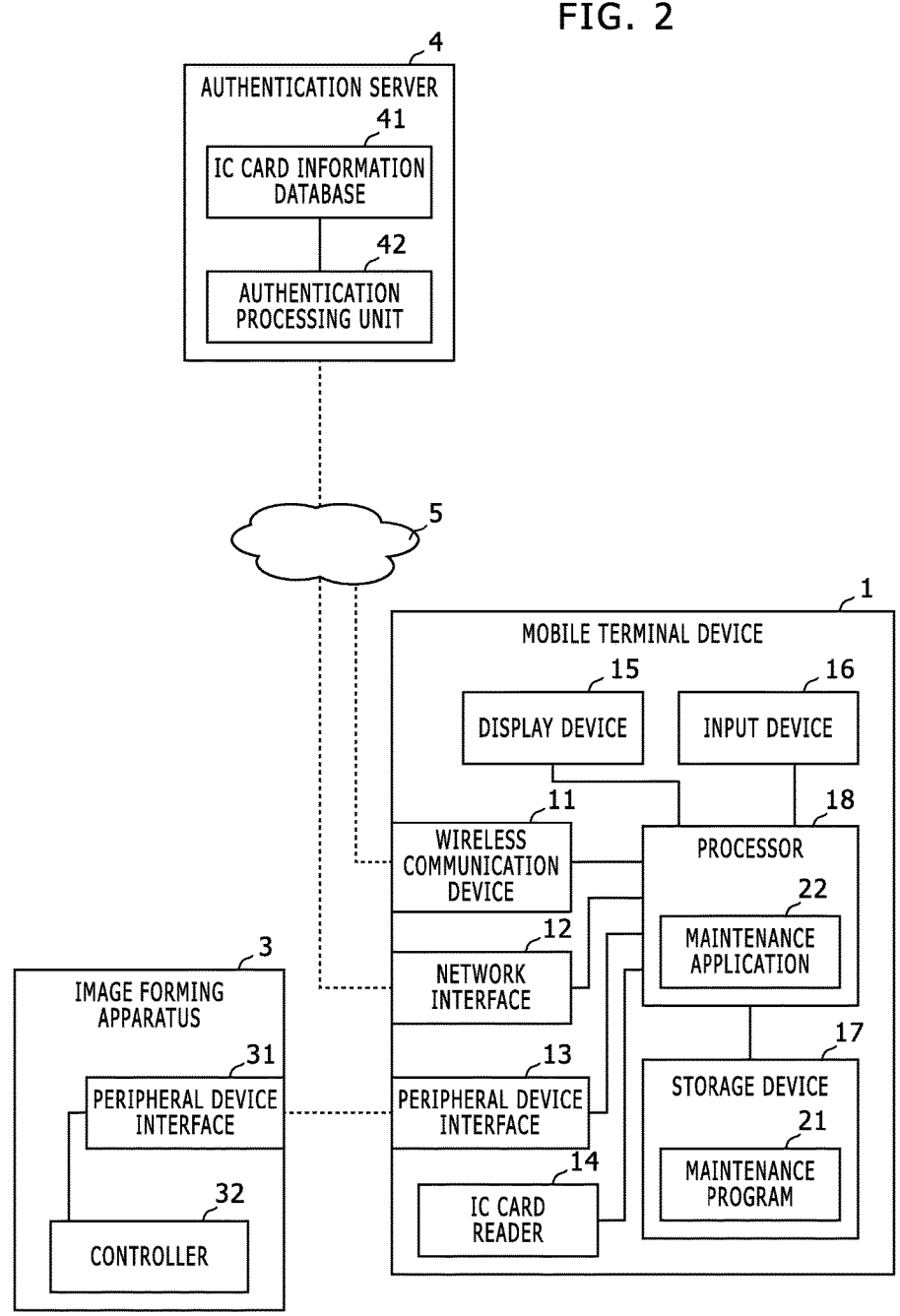
FIG. 2 shows a block diagram that indicates a configuration of a mobile terminal device 1 shown in FIG. 1.

FIG. 2 shows a block diagram that indicates a configuration of a mobile terminal device 1 shown in FIG. 1. As shown in FIG. 2, the mobile terminal device 1 is a general purpose mobile terminal device such as a smart phone, and includes a wireless communication device 11, a network interface 12, a peripheral device interface 13, an IC card reader 14, a display device 15, an input device 16, a storage device 17, a processor 18 and the like.

The wireless communication device 11 is a wireless communication device that connects to a cellular phone network. The wireless communication device 11 a wireless communication unit that connects to the network 5 through the cellular phone network and is capable of communicating with the authentication server 4 through the network 5.

The network interface 12 is a wireless communication unit that connects to the network 5 through a wireless LAN (Local Area Network) and is capable of communicating with the authentication server 4 through the network 5.

The peripheral device interface 13 is, for example, a wired USB (Universal Serial Bus) interface.

The IC card reader 14 obtains IC card identification information of the IC card 2 by contact-less communication with the IC chip built in the IC card 2.

The display device 15 is an internal device such as a liquid crystal display and displays an operation screen and the like for a user. The input device 16 is an internal device such as a touch panel and detects a user operation.

The storage device 17 is a nonvolatile storage device such as a flash memory or a hard disk. In the storage device 17, a maintenance program 21 is stored.

The processor 18 is a computer that includes a CPU (Central Processing Unit), a RAM (Random Access Memory), a ROM (Read Only Memory) and the like, and loads the maintenance program 21 to the RAM and executes the maintenance program 21 using the CPU, and thereby acts as a maintenance application 22.

The maintenance application 22 (a) obtains IC card identification information from the IC card 2 unique to a service person using the IC card reader 14 of the mobile terminal device 1, (b) transmits the obtained IC card identification information to the authentication server 4 using a wireless communication unit (i.e. the wireless communication device 11 or the network interface 12) of the mobile terminal device 1, (c) receives user rank information corresponding to the IC card identification information from the authentication server 4, and (d) transmits the received user rank information to the image forming apparatus 3 as a maintenance target using the peripheral device interface 13 and thereby causes the image forming apparatus 3 to permit usage of a maintenance function restricted to a usage permission range specified by the user rank information.

Further, the image forming apparatus 3 is a printer, a multi function peripheral or the like, has a maintenance function. The maintenance function enables actions that a normal user is prohibited from, such as reading a log and status information of sorts of functions, editing setting data of sorts of functions, and/or the like.

The image forming apparatus 3 includes a peripheral device interface 31 corresponding to the peripheral device interface 13 of the mobile terminal device 1, and a controller 32. The controller 32 receives the user rank information from the mobile terminal device 1 using the peripheral device interface 31, determines a usage permission range corresponding to the received user rank information, and permits usage of a maintenance function restricted to the usage permission range.

The authentication server 4 is connected to the network 5, and performs authentication of the IC card 2 of a service person, and provides user rank information of this service person.

The authentication server 4 includes an IC card information database 41, and an authentication processing unit 42. The IC card information database 41 manages IC card identification information corresponding to the IC card 2 of a service person and user rank information of this service person so as to be associated with each other. When receiving IC card identification information from the mobile terminal device 1, the authentication processing unit 42 determines user rank information corresponding to the received IC card identification information by using the IC card information database 41, and transmits the determined user rank information to the mobile terminal device 1.

Figure 3:
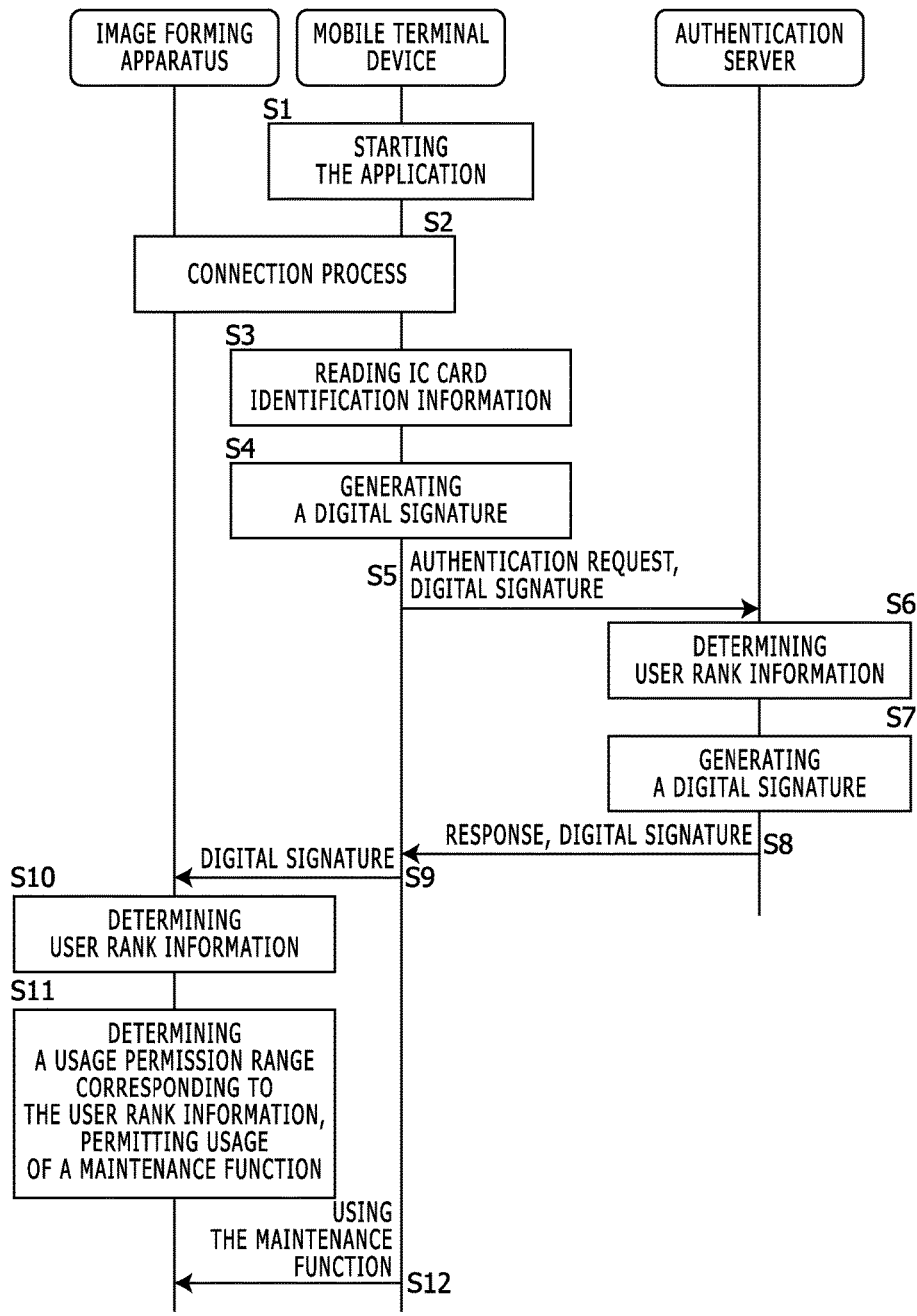
FIG. 3 shows a sequence diagram that explains authentication before using a maintenance function in the maintenance system of Embodiment 1.

The following part explains a behavior of each device in the maintenance system of Embodiment 1. FIG. 3 shows a sequence diagram that explains authentication before using a maintenance function in the maintenance system of Embodiment 1.

Firstly, a service person operates his/her mobile terminal device 1 and thereby starts the maintenance application 22 (in Step S1).

The service person connects the peripheral device interface 13 of the mobile terminal device 1 to the peripheral device interface 31 of the image forming apparatus 3 with a cable. When the peripheral device interface 31 is connected to the mobile terminal device 1, the controller 32 in the image forming apparatus 3 sets a permission status of communication with the maintenance application 22 (in Step S2).

Further, the maintenance application 22 in the mobile terminal device 1 obtains IC card identification information of the service person's IC card 2 using the IC card reader 14 (in Step S3).

The maintenance application 22 calculates a hash value of the obtained IC card identification information and generates a digital signature that includes the hash value (in Step S4), and transmits the digital signature to the authentication server 4 with an authentication request using the wireless communication unit (in Step S5).

When receiving the authentication request and the digital signature, the authentication processing unit 42 in the authentication server 4 extracts the hash value of the IC card identification information from the digital signature, compares the extracted hash value with a hash value of IC card identification information registered in the IC card information database 41, and determines whether IC card identification information of which a hash value agrees with the extracted has value is registered or not; and if the IC card identification is registered, determines user rank information corresponding to this IC card identification information (in Step S6), and generates a digital signature that includes this user rank information (in Step S7).

If IC card identification information of which a hash value agrees with the extracted has value is not registered, then the authentication processing unit 42 generates user rank information that indicates no registration, and generates a digital signature that includes this user rank information (in Step S7).

Subsequently, the authentication processing unit 42 in the authentication server 4 transmits the generated digital signature to the mobile terminal device 1 with a response to the aforementioned authentication request (in Step S8).

When receiving the response and the digital signature using the wireless communication unit in the mobile terminal device 1, the maintenance application 22 in the mobile terminal device 1 transmits the received digital signature to the image forming apparatus 3 using the peripheral device interface 13 (in Step S9).

When receiving the digital signature using the peripheral device interface 31, the controller 32 in the image forming apparatus 3 extracts the hash value from the received digital signature and determines user rank information corresponding to the extracted hash value (in Step S10), and determines a usage permission range corresponding to the determined user rank information and permits the connected mobile terminal device 1 to use a maintenance function within the determined usage permission range (in Step S11).

Afterward, the maintenance application 22 in the mobile terminal device 1 uses the maintenance function of the image forming apparatus 3 in accordance with an operation of the service person (in Step S12).

If the user rank information determined in Step S10 indicates no registration of the IC card identification information, then the controller 32 in the image forming apparatus 3 prohibits the connected mobile terminal device 1 from using the maintenance function.

As mentioned, in Embodiment 1, the maintenance application 22 in the mobile terminal device 1 (a) obtains IC card identification information from the IC card 2 unique to a service person using the IC card reader 14 of the mobile terminal device 1, (b) transmits the obtained IC card identification information to the authentication server 4 using a wireless communication unit of the mobile terminal device 1, (c) receives user rank information corresponding to the IC card identification information from the authentication server 4, and (d) transmits the received user rank information to the image forming apparatus 3 as a maintenance target using the peripheral device interface 13 and thereby causes the image forming apparatus 3 to permit usage of a maintenance function restricted to a usage permission range specified by the user rank information.

Consequently, a general purpose mobile terminal device obtains usage permission of a maintenance function of the image forming apparatus 3 and thereby can use the maintenance function of the image forming apparatus 3. Therefore, if a service person carries his/her IC card 2, after installing the maintenance program 21 in a general purpose mobile terminal device, the service person can maintain the image forming apparatus 3 using the general purpose mobile terminal device.

The IC card 2 hardly induces malfunction, and does not induce battery exhaustion because a reader side supplies electricity to the IC card 2. Therefore, even if the mobile terminal device 1 induces malfunction or battery exhaustion, alternatively using a general purpose mobile terminal device enables to maintain the image forming apparatus 3.

Embodiment 2

A maintenance system in Embodiment 2 performs exclusive control when another general purpose mobile terminal device 1 identical or similar to the mobile terminal device 1 (i.e. a mobile terminal device of another service person) is connected to the image forming apparatus 3 to which the aforementioned mobile terminal device 1 is still connected.

Figure 4:
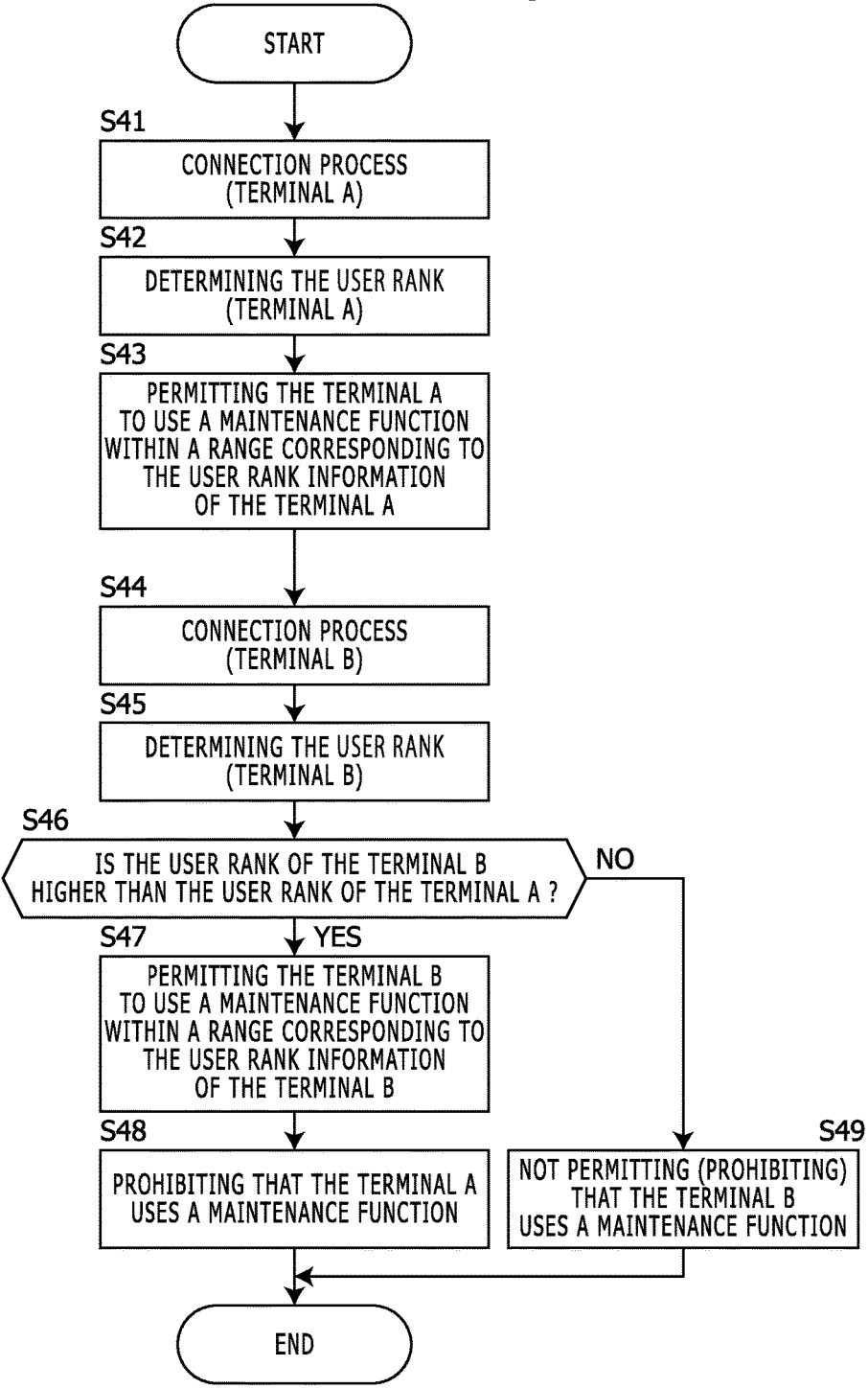
FIG. 4 shows a flowchart that explains a process performed when another general purpose mobile terminal device is connected to an image forming apparatus 3 in Embodiment 2.

FIG. 4 shows a flowchart that explains a process performed when another general purpose mobile terminal device is connected to an image forming apparatus 3 in Embodiment 2.

After a mobile terminal device 1 is connected and the connecting mobile terminal device 1 (hereinafter called Terminal A) is permitted to use a maintenance function (in Steps S41 to S43), as mentioned, if the controller 32 in the image forming apparatus 3 detects connection of another mobile terminal device (hereinafter called Terminal B) (i.e. connection to the peripheral device interface 31 with a cable as well as the connection of Terminal A), the controller 32 (a) receives user rank information from Terminal B (in Step S45), and (b) compares the user rank information of Terminal B with the user rank information of Terminal A (in Step S46); and (c) if a value of the user rank information (i.e. a user rank) of Terminal B is higher than a value of the user rank information of Terminal A, the controller 32 (c1) determines a usage permission range corresponding to the received user rank information of Terminal B and permits Terminal B to use a maintenance function restricted to the usage permission range (in Step S47) and (c2) prohibits Terminal A from using the maintenance function (in Step S48).

Contrarily, if the value of the user rank information of Terminal B is equal to or less than the value of the user rank information of Terminal A, the controller 32 does not permit Terminal B to use the maintenance function (in Step S49).

Figure 5:
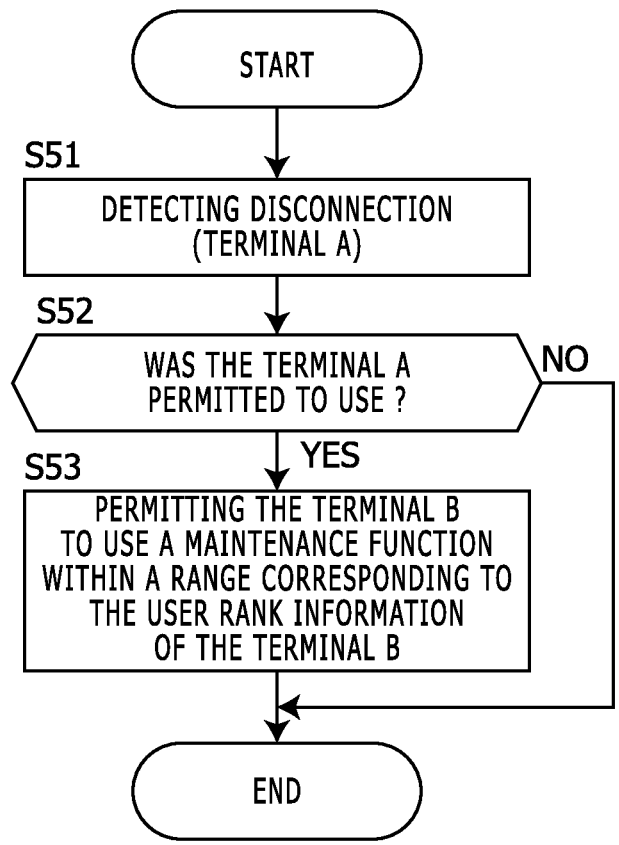
FIG. 5 shows a flowchart that explains a process performed when disconnecting one of plural general purpose mobile terminals connected to the image forming apparatus 3 in Embodiment 2.

FIG. 5 shows a flowchart that explains a process performed when disconnecting one of plural general purpose mobile terminals connected to the image forming apparatus 3 in Embodiment 2.

As mentioned, when two mobile terminal devices (Terminal A and Terminal B) are connected to the image forming apparatus 3 and then one of the two mobile terminal devices (Terminal A or Terminal B) is disconnected, the controller 32 in the image forming apparatus 3 detects the disconnection (in Step S51), and determines whether the disconnected mobile terminal device has been permitted to use the maintenance function or not (in Step S52); and if the disconnected mobile terminal device has been permitted to use the maintenance function, the controller 32 permits usage of the maintenance function restricted to the usage permission range of the other mobile terminal device not disconnected (in Step S53). Thus, in this case, after changing the usage permission range, the remaining mobile terminal device is permitted to use the maintenance function.

If the disconnected mobile terminal device has not been permitted to use the maintenance function, without doing anything, the other mobile terminal device not disconnected is continuously permitted to use the maintenance function.

Other parts of the configuration and behaviors of the maintenance system in Embodiment 2 are identical or similar to those in Embodiment 1, and therefore not explained here.

Embodiment 3

In Embodiment 3, before the mobile terminal device 1 is connected to the image forming apparatus 3 through the peripheral device interfaces 13 and 31, the maintenance application 22 in the mobile terminal device 1 (a) obtains IC card identification information using the IC card reader 14, (b) transmits the obtained IC card identification information to the authentication server 4 using the wireless communication unit, (c) receives user rank information corresponding to the IC card identification information from the authentication server 4, and (d) after the mobile terminal device 1 is connected to the image forming apparatus 3 using the peripheral device interface 13, immediately transmits the received user rank information to the image forming apparatus 3 using the peripheral device interface 13.

FIG. 6 shows a sequence diagram that explains authentication before using a maintenance function in the maintenance system of Embodiment 3.

Firstly, a service person operates his/her mobile terminal device 1 and thereby starts the maintenance application 22 (in Step S101).

Further, in Embodiment 3, before the peripheral device interface 13 in the mobile terminal device 1 is connected to the peripheral device interface 31 in the image forming apparatus 3, the maintenance application 22 in the mobile terminal device 1 obtains IC card identification information of the service person's IC card 2 using the IC card reader 14 (in Step S102).

The maintenance application 22 calculates a hash value of the obtained IC card identification information and generates a digital signature that includes the hash value (in Step S103), and transmits the digital signature to the authentication server 4 with an authentication request using the wireless communication unit (in Step S104).

When receiving the authentication request and the digital signature, the authentication processing unit 42 in the authentication server 4 extracts the hash value of the IC card identification information from the digital signature, compares the extracted hash value with a hash value of IC card identification information registered in the IC card information database 41, and determines whether IC card identification information of which a hash value agrees with the extracted has value is registered or not; and if the IC card identification is registered, determines user rank information corresponding to this IC card identification information (in Step S105), and generates a digital signature that includes this user rank information (in Step S106).

If IC card identification of which a hash value agrees with the extracted has value is not registered, then the authentication processing unit 42 generates user rank information that indicates no registration, and generates a digital signature that includes this user rank information (in Step S106).

Subsequently, the authentication processing unit 42 in the authentication server 4 transmits the generated digital signature to the mobile terminal device 1 with a response to the aforementioned authentication request (in Step S107).

The maintenance application 22 in the mobile terminal device 1 receives the response and the digital signature using the wireless communication unit in the mobile terminal device 1. Afterward, the maintenance application 22 in the mobile terminal device 1 receives setting reservation input of a maintenance function in the basis of a service person's operation (in Step S108).

After the setting reservation input of the maintenance function, the service person connects the peripheral device interface 13 of the mobile terminal device 1 to the peripheral device interface 31 of the image forming apparatus 3 with a cable. When the peripheral device interface 31 is connected to the mobile terminal device 1, the controller 32 in the image forming apparatus 3 sets a permission status of communication with the maintenance application 22 (in Step S109).

When detecting that the connection is completed, the maintenance application 22 immediately transmits the digital signature to the image forming apparatus 3 using the peripheral device interface 13 (in Step S110).

When receiving the digital signature using the peripheral device interface 31, the controller 32 in the image forming apparatus 3 extracts the hash value from the received digital signature and determines user rank information corresponding to the extracted hash value (in Step S111), and determines a usage permission range corresponding to the determined user rank information and permits the connected mobile terminal device 1 to use a maintenance function within the determined usage permission range (in Step S112).

Afterward, when the maintenance application 22 in the mobile terminal device 1 is permitted to use the maintenance function, the maintenance application 22 immediately transmits the setting reservation information inputted in Step S108 to image forming apparatus 3 and thereby uses the maintenance function (in Step S113). Specifically, the controller 32 in the image forming apparatus 3 performs setting of the maintenance function in accordance with the setting reservation information.

If the user rank information determined in Step S111 indicates no registration of the IC card identification information, then the controller 32 in the image forming apparatus 3 prohibits the connected mobile terminal device 1 from using the maintenance function.

Other parts of the configuration and behaviors of the maintenance system in Embodiment 3 are identical or similar to those in Embodiment 1 or 2, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned Embodiment 1, 2 or 3, instead of generating the hash value of the IC card identification information, a hash value of both the IC card identification information and other information (e.g. a terminal ID of the mobile terminal device 1, time information and/or the like) may be generated. In such manner, the IC card identification information is also transmitted from the mobile terminal device 1 to the authentication server 4.

What is claimed is:
1. A maintenance system, comprising:
an IC card unique to a service person;
a general purpose mobile terminal device;
an image forming apparatus as a maintenance target; and
an authentication server;
wherein the general purpose mobile terminal device comprises:
a wireless communication unit capable of communicating with the authentication server:
a peripheral device interface capable of communicating with the image forming apparatus;
an IC card reader configured to obtain IC card identification information of the IC card; and
a maintenance authentication processing unit;

wherein the maintenance authentication processing unit
(a) obtains the IC card identification information using the IC card reader, (b) transmits the obtained IC card identification information to the authentication server using the wireless communication unit, (c) receives user rank information corresponding to the IC card identification information from the authentication server, and (d) transmits the received user rank information to the image forming apparatus using the peripheral device interface;

the authentication server manages the IC card identification information corresponding to IC cards of the service persons and the user rank information of the service persons so as to associate the IC card identification information and the user rank information with each other in a database, and when receiving the IC card identification information from the general purpose mobile terminal device, determines the user rank information corresponding to the received IC card identification information using the database and transmits the determined user rank information to the general purpose mobile terminal device; and the image forming apparatus receives the user rank information from the general purpose mobile terminal device, determines a usage permission range corresponding to the received user rank information, and permits usage of a maintenance function restricted to the usage permission range, wherein after the general purpose mobile terminal device is connected to the image forming apparatus and the image forming apparatus permits the connected general purpose mobile terminal device to use the maintenance function, when another general purpose mobile terminal device is connected to the image forming apparatus, the image forming apparatus (a) receives user rank information from the another general purpose mobile terminal device, (b) compares the user rank information of the general purpose mobile terminal device permitted to use the maintenance function and the user rank information of the another general purpose mobile terminal device with each other; and (c) if a value of the user rank information of the another general purpose mobile terminal device is higher than a value of the user rank information of the general purpose mobile terminal device permitted to use the maintenance function, (c1) determines a usage permission range corresponding to the received user rank information of the another general purpose mobile terminal device and permits the another general purpose mobile terminal device to use of the maintenance function restricted to the usage permission range and (c2) prohibits the general purpose mobile terminal device permitted to use the maintenance function from using the maintenance function.

2. The maintenance system according to claim 1, wherein if the another general purpose mobile terminal device is disconnected, the image forming apparatus permits the general purpose mobile terminal device prohibited from using the maintenance function to use of the maintenance function restricted to the usage permission range.

3. A maintenance system, comprising:
an IC card unique to a service person;
a general purpose mobile terminal device;
an image forming apparatus as a maintenance target; and
an authentication server;
wherein the general purpose mobile terminal device comprises:

a wireless communication unit capable of communicating with the authentication server;
a peripheral device interface capable of communicating with the image forming apparatus;
an IC card reader configured to obtain IC card identification information of the IC card; and
a maintenance authentication processing unit;
wherein the maintenance authentication processing unit
(a) obtains the IC card identification information using the IC card reader, (b) transmits the obtained IC card identification information to the authentication server using the wireless communication unit, (c) receives user rank information corresponding to the IC card identification information from the authentication server, and (d) transmits the received user rank information to the image forming apparatus using the peripheral device interface;

the authentication server manages the IC card identification information corresponding to IC cards of the service persons and the user rank information of the service persons so as to associate the IC card identification information and the user rank information with each other in a database, and when receiving the IC card identification information from the general purpose mobile terminal device, determines the user rank information corresponding to the received IC card identification information using the database and transmits the determined user rank information to the general purpose mobile terminal device; and the image forming apparatus receives the user rank information from the general purpose mobile terminal device, determines a usage permission range corresponding to the received user rank information, and permits usage of a maintenance function restricted to the usage permission range, wherein before the general purpose mobile terminal device is connected to the image forming apparatus using the peripheral device interface, the maintenance authentication processing unit (a) obtains the IC card identification information using the IC card reader, (b) transmits the obtained IC card identification information to the authentication server using the wireless communication unit, and (c) receives user rank information corresponding to the IC card identification information from the authentication server; and after the general purpose mobile terminal device is connected to the image forming apparatus using the peripheral device interface, the maintenance authentication processing unit (d) immediately transmits the received user rank information to the image forming apparatus using the peripheral device interface.

4. A computer readable recording medium storing a maintenance program, the maintenance program causing a computer in a general purpose mobile terminal device to act as a maintenance authentication processing unit;
wherein the maintenance authentication processing unit
(a) obtains IC card identification information from an IC card unique to a service person using an IC card reader of the general purpose mobile terminal device, (b) transmits the obtained IC card identification information to an authentication server using a wireless communication device of the general purpose mobile terminal device, (c) receives user rank information corresponding to the IC card identification information from the authentication server, and (d) transmits the received user rank information to an image forming apparatus as a maintenance target using a peripheral device interface of the general purpose mobile terminal device and thereby causes the image forming apparatus to permit usage of a maintenance function restricted to a usage permission range specified by the user rank information, wherein before the general purpose mobile terminal device is connected to the image forming apparatus using the peripheral device interface, the maintenance authentication processing unit (a) obtains the IC card identification information using the IC card reader, (b) transmits the obtained IC card identification information to the authentication server using the wireless communication unit, and (c) receives user rank information corresponding to the IC card identification information from the authentication server; and after the general purpose mobile terminal device is connected to the image forming apparatus using the peripheral device interface, the maintenance authentication processing unit (d) immediately transmits the received user rank information to the image forming apparatus using the peripheral device interface.

\* \* \* \* \*